Patented July 5, 1949

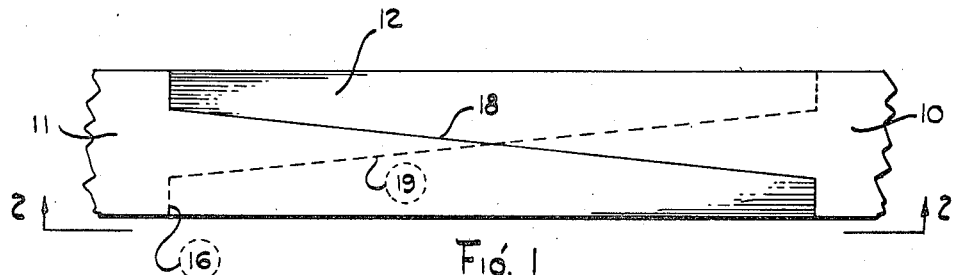
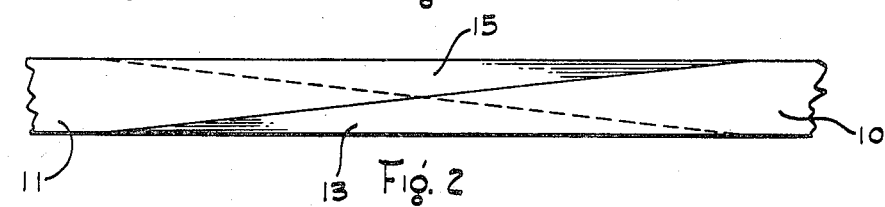
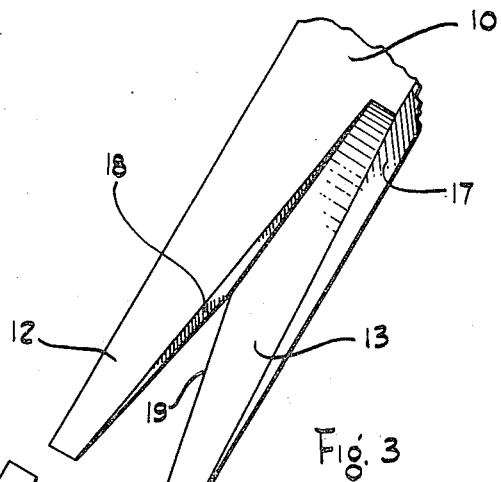
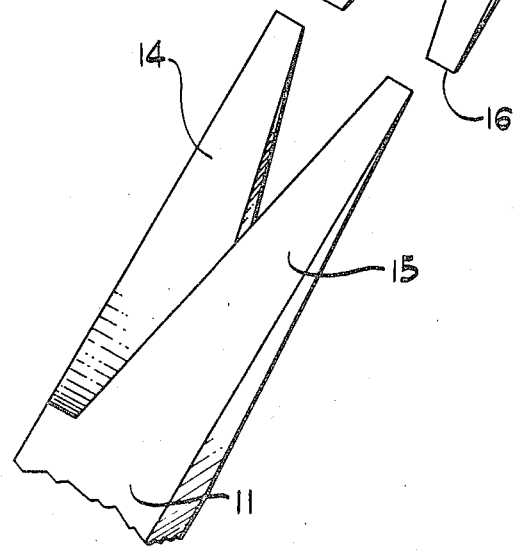

2,475,046

UNITED STATES PATENT OFFICE 2,475,046

WOOD JOINT

Axel V. Pedersen, Los Angeles, Calif.

Application February 15, 1947, Serial No. 728,795

7 Claims. (Cl. 20—92)

This invention relates to improvements in wood joints and may be regarded as an improvement over the wood joint disclosed in my co-pending application Serial No. 516,067 filed December 29, 1943 entitled Truss construction, now abandoned.

In the above-mentioned application there is disclosed a wood joint for connecting wooden elements in end to end relationship wherein each of the elements has at its ends a pair of tongues complementary to a similar pair of tongues on an adjoining element. These tongues are oppositely scarfed from one face of a board to the other face thereof, the slopes of the scarfs being equal and with the inner sides of the tongues arranged in a vertical plane parallel to the length of the element and at right angles to the top and bottom face of the element. As disclosed in said application if the slopes of the scarfs on the tongues are materially greater than 1:1 and preferably in the neighborhood of 1:6 or greater the joint is capable of transmitting stresses to a higher degree of efficiency so that if the pieces are glued together at the scarfed surfaces no great reliance need be placed upon the glue to transmit these stresses.

An object of the present invention is to provide an improved wood joint of this character characterized by the fact that although the tongues are oppositely scarfed from one face to the other of the element the inner faces of the tongues instead of being in a plane parallel to the longitudinal axis of the elements are likewise scarfed so that the planes of the inner faces of the tongues are at angles to the longitudinal axis through the elements. The scarfing of the inner sides of the tongues is preferably but not necessarily equal in slope to the slope of the scarf from one face to the other and is preferably coterminous therewith. In this manner each tongue may be regarded as presenting two sides both of which are scarfed in directions at right angles to each other or in other words across the width as well as across the thickness. Consequently in assembling the elements whose ends have been thus formed there is a compound centering and tightening action in that the scarfed surfaces across the thickness of the elements will tend to mutually tighten as the elements are brought together and the scarfed surfaces at the sides of the tongue will likewise tend to mutually tighten as the elements are brought together. By having the joint thus automatically tightened in two directions a much sturdier and much more efficient joint for the transmission of stresses is developed than in the case where the tongues are merely scarfed across the thickness.

With the foregoing and other objects in view, which will be made manifest in the following detailed description and specifically pointed out in the appended claims, reference is had to the accompanying drawings for an illustrative embodiment of the invention wherein:

Figure 1 is a top plan view of a wood joint embodying the present invention in assembled condition;

Fig. 2 is a view in end elevation of the same; and

Fig. 3 is an exploded or expanded view of the elements of the joint prior to assembly.

Referring to the accompanying drawings wherein similar reference characters designate similar parts throughout, 10 and 11 may be regarded as two wooden elements illustrated as being of equal width and equal thickness which it is desired to join together in end to end relationship in such a manner as to be capable of efficiently transmitting stresses across the joint. These elements may be lamination sections or chords of a truss or they may be employed for any other structural purpose. The grain of the wood may be assumed to be running lengthwise of the elements 10 and 11 in the same manner as that in which the grain normally runs in any ordinary board. In accordance with the present invention each element 10 and 11 has at its ends a pair of mutually complementary tongues, the tongues on the element 10 being indicated at 12 and 13 and the tongues on the element 11 being indicated at 14 and 15. The tongue 13 is scarfed from the upper surface or top face thereof across the thickness to the bottom surface or face of the element. In a similar manner the tongue 12 is scarfed in the opposite direction, that is, from the bottom or undersurface of the element 10 to the top face thereof. The tongues 14 and 15 are oppositely scarfed in a similar manner to present surfaces complementary to the above-mentioned scarfed surfaces on the tongues 12 and 13. The scarfs across the thickness of the elements 10 and 11 are preferably of equal slopes and are coterminous so that the ends of the tongues indicated at 16 are preferably in the same transverse plane although such an arrangement is not essential to the present invention.

The inner faces of the tongues are those faces which are remote from the edges 17 of the element and which are indicated at 18 and 19 respectively are likewise oppositely scarfed from adjacent one side edge of the element toward the other side edge thereof. The slopes of these scarfs are preferably equal to each other and equal to the slopes of the scarfs across the thickness. They are likewise preferably coterminous with the scarfs across the thickness. It will be appreciated, however, that the equality in the slopes of the scarfs on the inner edges of the tongues and their equality to the slopes on the faces of the tongues is not essential to the present invention although highly preferred for purposes of uniformity.

The planes of the scarfed inner edges of the tongues are preferably vertical or in other words perpendicular to the top and bottom surfaces of the elements 10 and 11 respectively to facilitate their being cut. As illustrated the scarfs on the inner edges of the tongues preferably do not extend from one side edge of an element to the other side edge thereof so that each tongue although it will be relatively thin at its extreme end will be of some substantial width. The slopes of the various scarfs preferably exceeds materially a slope of 1:1 and in the preferred form of construction is in the neighborhood of 1:6 although in some instances the slope may be as gentle as 1:12. Even if the slope is as abrupt as 1:3 a joint capable of transmitting bending moments to a relatively high degree of efficiency is obtainable.

In assembling a wood joint of this character glue is applied to the scarfed surfaces of the various tongues and the elements 10 and 11 forced towards each other from the position shown in Fig. 3. In the process of assembly the upper scarfed surface on tongue 13 will engage the under-scarfed surface on tongue 15 and the under-scarfed surface on tongue 12 will engage its complementary upper scarfed surface on tongue 14. Simultaneously the inner scarfed edge 18 on tongue 12 will engage the inner scarfed edge on tongue 15 that is complementary thereto and the inner scarfed edge 19 on tongue 13 will engage the complementary inner scarfed edge on tongue 14. Consequently on forcing the elements 10 and 11 lengthwise into firm engagement with each other the scarfs across the thickness of the elements will tighten the joint in a direction through the thickness and the scarfs on the edges of the tongues will simultaneously tighten the joint in a direction across the width of the elements. It will be found that such a joint is capable of transmitting bending moments both in a direction across the thickness as well as across the width even though no glue or other adhesive is present and that if glue is present and is allowed to dry or set that virtually the maximum strength of the elements is developed across the joint. Consequently no great reliance is required to be placed on the glue or other adhesive in developing a structural element made up of pieces embodying the improved joint. By reason of the self-wedging or self-tightening action of the joint as the parts are forced together in end to end relation it is possible to apply the glue to the scarfed surfaces then assemble the elements 10 and 11 and if the assembled elements are to form laminations of a curved chord of a truss or of an arch they may be immediately placed in a bending form and bent to the desired shape without waiting for the glue in the joint to dry. Even if the elements 10 and 11 should be bent as in forming a curved chord or arch prior to the drying or setting of the glue the joint will not open during the bending. Consequently the drying of the glue in the joint may take place after the laminations have been bent to the desired shape and while glue between adjacent faces of adjacent laminations is drying or setting or while other operations are being performed. It will be appreciated that the formation of the tongues can be easily performed by merely providing a suitable jig or holder that will position the elements 10 with relation to a routing tool, the patch of which with respect to the elements is at an angle to the thickness of the board and at an angle to its longitudinal axis rather than parallel to said axis as in the case of the joint disclosed in the prior application above referred to.

Inasmuch as in the preferred form of construction each tongue is identical in size and shape to the other tongue at each joint all of the various elements required to make up a chord, arch or other structural member can be easily and uniformly shaped thus enabling any element to be joined with any other element. In other words no special matching or pairing of the ends of adjacent elements is required.

Various changes may be made in the details of construction without departing from the spirit and scope of the invention as defined by the appended claims.

I claim:

1. A wood joint wherein the joined pieces each have complementary pairs of tongues scarfed in opposite directions both across the width and across the thicknesses of the pieces.

2. A wood joint wherein the joined pieces each have complementary pairs of tongues scarfed in opposite directions both across the width and across the thicknesses of the pieces, the slopes of the scarfs in both directions being substantially equal.

3. A wood joint wherein the joined pieces each have complementary pairs of tongues scarfed in opposite directions both across the width and across the thicknesses of the pieces, the scarfs in both directions being of equal slope and being substantially coterminous.

4. A wood joint for attaching adjacent ends of two wood pieces wherein the pieces have complementary pairs of tongues the tongues on each piece being scarfed in opposite directions from one face of the piece to the other face thereof, and the inner edges of the tongues are scarfed toward the edges of the pieces.

5. A wood joint for attaching adjacent ends of two wood pieces wherein the pieces have complementary pairs of tongues the tongues on each piece being scarfed in opposite directions from one face of the piece to the other face thereof and the inner edges of the tongues are scarfed toward the edges of the pieces, the scarfs being of equal slopes.

6. A wood joint for attaching adjacent ends of two wood pieces wherein the pieces have complementary pairs of tongues the tongues on each piece being scarfed in opposite directions from one face of the piece to the other face thereof and the inner edges of the tongues are scarfed toward the edges of the pieces, the scarfs being of equal slopes and being coterminous.

7. A wood joint for attaching adjacent ends of two wood pieces wherein the pieces have complementary pairs of tongues the tongues on each piece being scarfed in opposite directions from one face of the piece to the other face thereof and the inner edges of the tongues are scarfed toward the edges of the pieces, the scarfs being of equal slopes and being coterminous and being so arranged that the ends of the tongues are of some substantial width.

AXEL V. PEDERSEN.

REFERENCES CITED

The following references are of record in the file of this patent:

UNITED STATES PATENTS

| Number | Name | Date |
| --- | --- | --- |
| 2,409,383 | Pedersen | Oct. 15, 1946 |